United States Patent

Kohlhage

[11] 4,102,441
[45] Jul. 25, 1978

[54] FLEXIBLE RESILIENT BRAKE BAND ASSEMBLY

[75] Inventor: Ernst Kohlhage, Bühl, Baden, Germany

[73] Assignee: LuK Lamellen und Kupplungsbau GmbH, Bühl, Germany

[21] Appl. No.: 828,885

[22] Filed: Aug. 29, 1977

Related U.S. Application Data

[63] Continuation of Ser. No. 671,097, Mar. 29, 1976, abandoned.

[30] Foreign Application Priority Data

Apr. 11, 1975 [DE] Fed. Rep. of Germany ....... 2515788

[51] Int. Cl.² ............................................. F16D 49/08
[52] U.S. Cl. ................................. 188/77 W; 188/249; 188/259; 192/107 T
[58] Field of Search ............... 188/249, 259, 250 H, 188/77 W, 77 R; 192/80, 79, 107 T

[56] References Cited

U.S. PATENT DOCUMENTS

| 3,367,466 | 2/1968 | Lang ............................ 188/259 X |
| 3,399,749 | 9/1968 | Baule ............................ 188/259 |
| 3,869,785 | 3/1975 | Victory ........................ 188/259 X |

Primary Examiner—Trygve M. Blix
Assistant Examiner—Douglas C. Butler
Attorney, Agent, or Firm—Herbert L. Lerner

[57] ABSTRACT

Brake band assembly for a wrap-around brake includes a metal band, a friction lining carried by the metal band, a support member for the metal band mountable on a device for actuating and supporting the brake band assembly, and at least one securing strap securing the support member to the metal band, the support member comprising a shell narrower than the end width of the metal band and being at least partly encircled collar-like by the securing strap.

14 Claims, 2 Drawing Figures

FLEXIBLE RESILIENT BRAKE BAND ASSEMBLY

This is a continuation of application Ser. No. 671,097, filed Mar. 29, 1976, now abandoned. The invention relates to a flexible resilient brake band assembly for a wrap-around brake, such as has become known heretofore, for example, from German Patent DT - PS 1 621 685, which corresponds to U.S. Pat. No. 3,399,749, and which is formed of a metal band equipped with a friction lining and having attached at least at one of its ends, a support member of means for actuating and supporting the band, such as a push rod, for example.

Such supporting members or end reinforcements have been formed heretofore as bent-over sheet metal straps and have been welded to the metal band. It has been found, however, that these bent sheetmetal straps do not have sufficient inherent or natural stability in all cases so that, during the actuation or operation of the brake band, variations in the setting of the band operation may occur. Marked wear occurs at the supporting parts, because economic use of optionally wear-resistant material, such as case-hardened material, is not possible since the supporting parts must be considerably deformed and must also be welded on, thereafter. In addition, the production of such bands is relatively complicated and costly.

It is an object of the invention of the instant application to provide a brake band assembly, the supporting parts of which are particularly wear-resistant and inherently stable and which are furthermore distinguished by relatively simple and low-cost production methods.

With the foregoing and other objects in view, there is provided in accordance with the invention, a brake band assembly, for a wrap-around brake comprising a metal band, a friction lining carried by the metal band, a support member for the metal band mountable on a device for actuating and supporting the brake band assembly, and at least one securing strap, securing the support member to the metal band, the support member comprising a shell narrower than the end width of the metal band, and being at least partly encircled collar-like by the securing strap.

By means of the invention, assurance is provided that optimally wear-resistant material may be used for the shell, which can, moreover, be formed of a relatively costly material, because the sleeve need only have relatively small dimensions. This shell is, for example, an extrusion-molded or case-hardened nember, according to the features of the invention. The securing strap may be made of conventional, inexpensive, readily deformable and weldable material. In accordance with another feature of the invention, the securing strap is fastened to the shell e.g. a sleeve which, before being applied to the strap, for example, by soldering or welding, is secured to the metal band of the wrap-around brake assembly e.g. by spot-welding. It is also possible, however, first to attach the strap to the band, to insert or press-in the shell or the sleeve and subsequently to solder or weld the latter thereto.

In order to attain an attachment of the strap that is especially highly stressable, in accordance with an added feature of the invention, the strap is provided with extensions projecting beyond the collar-like portions on both sides of the shell or sleeve and in a direction facing away from the ends of the band, the extensions being also attached to the band, for example, by welding.

According to an additional feature of the invention, the shell or sleeve is formed with a shoulder, with which it can brace itself against the rim of the collar of the securing strap that surrounds the shell. It is of particular advantage, when the shoulder and the support rim engage one another over the entire cross-sectional area thereof.

In accordance with other features of the invention, the sleeve is a conical member or a member having a conical region and has, at least over the collar-like encircled portion, between the shoulder and the conical part, a cylindrical section, while an opposing section, which faces the band, is conformable to the band over partial regions thereof.

In accordance with a concomitant feature of the invention, the encircling collar-like portion of the strap, at least, is formed substantially without any reduction of the cross section thereof.

Although the invention is illustrated and described herein as embodied in brake band assembly, it is nevertheless not intended to be limited to the details shown, since various modifications and structural changes may be made therein without departing from the spirit of the invention and within the scope and range of equivalents of the claims.

The construction and method of the invention, however, together with additional objects and advantages thereof will be best understood from the following description of specific embodiments when read in connection with the accompanying drawings, in which.

Figure 2:
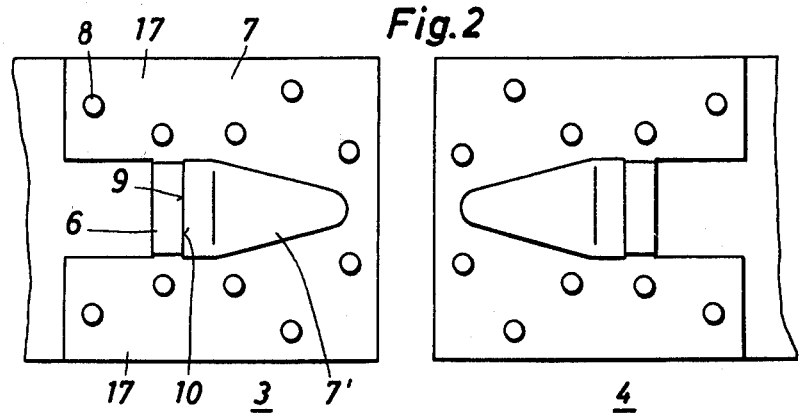
FIG. 2 is a plan view of FIG. 1 as seen in the direction of the arrow II of FIG. 1.
Figure 1:
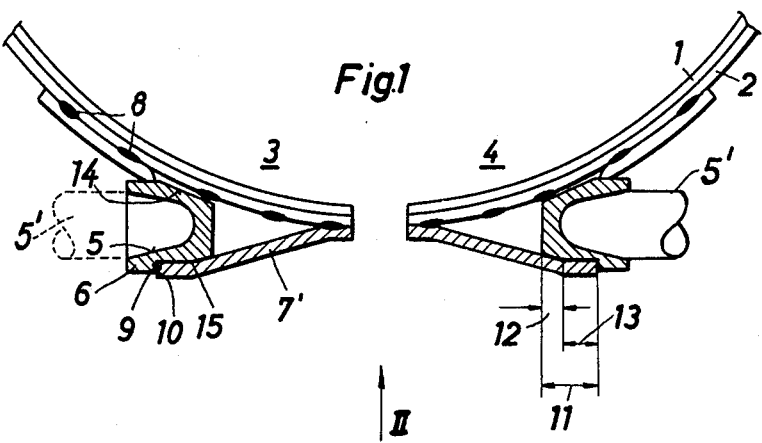
FIG. 1 is a front elevational view, partly in section, of the ends of a brake band assembly according to the invention.

Referring now to the figures, there is shown therein a brake band assembly which includes a resilient metal band 2 equipped with a friction lining 1 and having, in the vicinity of the ends thereof, respective support members 3 and 4 which are constructed in the form of mirror images of one another. Accordingly, the invention will be explained hereinafter, only with reference to the one support member 3, however, the explanation is equally applicable to the other support member 4. In detail, this support member 3 is formed of a shell or sleeve 6 which has a counterform 5 adapted to match with a push rod 5' receivable therein, and is retained by a securing strap 7 which surrounds the sleeve 6 partially by a collar-like portion 7' and which is fastened to the band 2 by means for inseparably bonding them to one another, such as spot weldments 8. The sleeve 6 has a shoulder 9 with which it abuts a surface 10 i.e. the rim of the collar 7'. The encircled or surrounded portion 11 of the sleeve 6 has a conical or frustoconical portion 12 on the side thereof facing toward the collar-like portion 7' of the securing strap 7 and has a portion 13 that is cylindrical, thereby, the position of the sleeve 6 is definitely fixed, even with the incident manufacturing tolerances, and the sleeve 6 can be soldered on without requiring any additional mounting or support. On the opposite side of the sleeve 6 from the collar-like portion 7' i.e. on the side thereof facing the band 2, the sleeve 6 has a formed surface 14 corresponding to and matching the surface of the band 2 thereof. In a conventional manner, a solder joint 15 is formed in the region 11 between the sleeve 6 and the collar 7', and the sleeve 6 together with the securing or fastening strap 7 is then welded to the band 2.

It is advantageous to form the collar-like applied portion 7' without any significant deformation of the strap cross section, by punching out the latter with a suitably greater width over the length of the region 7'.

The strap 7 has extensions 17 on both sides of the sleeve 6, facing in the direction away from the ends of the strap, the extensions 17 ensuring high load-carrying capacity of the brake band assembly.

There are claimed:

1. A brake band assembly for a wrap-around brake comprising a metal band having a pair of ends, a friction lining carried by said metal band, means for actuating and supporting the brake band assembly, at least one support member for said means, said support member being mounted on said band at an end thereof, and at least one securing strap securing said support member to said metal band, said support member comprising at least two separate parts including a shell narrower than the end width of the metal band and formed of a material more wear-resistant than the material of the securing strap, and a collar-like portion of said securing strap at least partly encircling said shell.

2. Apparatus according to claim 1 wherein said means for actuating and supporting the brake band assembly is a push rod, and said shell has a shape mating with that of the push rod.

3. Apparatus according to claim 1 wherein said strap is secured on both sides of said shell to said metal band.

4. Apparatus according to claim 3 wherein said strap is secured to said shell by weldment.

5. Apparatus according to claim 1 wherein said shell is an extrusion-molded member.

6. Apparatus according to claim 1 wherein said shell is a sleeve formed with a shoulder, and said collar-like portion of said securing strap surrounding said sleeve, is formed with a rim, said rim being in bracing engagement with said shoulder of said sleeve.

7. Apparatus according to claim 6 wherein said securing strap has extensions projecting beyond the rim of said collar-like portion thereof in direction away from the ends of said metal band.

8. Apparatus according to claim 6 wherein said sleeve is pressfitted into said collar-like portion of said securing strap.

9. Apparatus according to claim 6 wherein said sleeve is pressfitted between said collar-like portion of said strap and said metal band.

10. Apparatus according to claim 6 wherein the portion of said sleeve surrounded by said collar-like portion of said strap is conical.

11. Apparatus according to claim 10 wherein said sleeve has a cylindrical cross section between said conical portion of said sleeve and said shoulder thereof engaged by the rim of said collar-like portion of said securing strap.

12. Apparatus according to claim 6 wherein said collar-like portion of said securing strap has a cross section substantially equal to that of the remainder of said strap.

13. Apparatus according to claim 1 including means for inseparably bonding said shell, said securing strap and said metal band to one another.

14. A brake band assembly for a wrap-around brake comprising a metal band having a pair of ends, a friction lining carried by said metal band, means comprising at least one push rod for actuating and supporting the brake band assembly, at least one support member for said push rod mounted on said band at an end thereof, and at least one securing strap formed with a collar-like portion securing said support member to said metal band by a weldment, said securing strap having extensions projecting beyond said collar-like portion thereof and away from the respective end of said metal band, said support member comprising at least two separate parts including a shell narrower than the end width of the metal band and formed of a material more wear-resistant than the material of the securing strap, and said collar-like portion of said securing strap at least partly encircling said shell, said shell having a shape mating with that of said push rod.

* * * * *